United States Patent

Bocchieri et al.

Patent Number: 5,329,608
Date of Patent: Jul. 12, 1994

[54] AUTOMATIC SPEECH RECOGNIZER

[75] Inventors: Enrico L. Bocchieri, Madison, N.J.; Sedat I. Gokcen; Rajendra P. Mikkilineni, both of Gahanna, Ohio; David B. Roe, Berkeley Heights; Jay G. Wilpon, Warren, both of N.J.

[73] Assignee: AT&T Bell Laboratories, Murray Hill, N.J.

[21] Appl. No.: 108,839

[22] Filed: Aug. 18, 1993

Related U.S. Application Data

[63] Continuation of Ser. No. 862,394, Apr. 2, 1992.

[51] Int. Cl.⁵ .............................. G10L 5/04
[52] U.S. Cl. .................. 395/2.52; 395/2.63
[58] Field of Search ............... 381/41–43; 395/2.69, 2.52, 2.4, 2.6–2.66

[56] References Cited

U.S. PATENT DOCUMENTS

| Re. 32,012 | 10/1985 | Pirz et al. | 381/43 |
|---|---|---|---|
| Re. 33,597 | 5/1991 | Levinson et al. | 381/43 |
| 4,277,644 | 7/1981 | Levinson et al. | 395/2.66 |
| 4,757,541 | 7/1988 | Beadles | 381/43 |
| 4,882,759 | 11/1989 | Bahl et al. | 381/51 |
| 4,980,918 | 12/1990 | Bahl et al. | 395/2 |
| 5,027,406 | 6/1991 | Roberts et al. | 395/2 |
| 5,033,087 | 7/1991 | Bahl et al. | 395/2 |
| 5,072,452 | 12/1991 | Brown et al. | 381/43 |

Primary Examiner—David D. Knepper
Attorney, Agent, or Firm—Dwight A. Marshall; Charles L. Warren

[57] ABSTRACT

Apparatus and method for recording data in a speech recognition system and recognizing spoken data corresponding to the recorded data. The apparatus and method responds to entered data by generating a string of phonetic transcriptions from the entered data. The data and generated phonetic transcription string associated therewith is recorded in a vocabulary lexicon of the speech recognition system. The apparatus and method responds to receipt of spoken data by constructing a model of subwords characteristic of the spoken data and compares the constructed subword model with ones of the recorded lexicon vocabulary recorded phonetic transcription strings to recognize the spoken data as the data identified by and associated with a phonetic transcription string matching the constructed subword string.

12 Claims, 5 Drawing Sheets

AUTOMATIC SPEECH RECOGNIZER

This application is a continuation of application Ser. No. 07/862,394, filed on Apr. 2, 1992.

FIELD OF THE INVENTION

The invention relates to apparatus and method for generating word models used in speech recognition systems and in particular to word models used to recognize spoken words.

BACKGROUND AND PROBLEM

Speech recognition systems are increasingly used in applications to recognize and respond to spoken information. In a typical application, a department store uses a speech recognition system in telephone sales operations to inform calling customers of new merchandise and to accept customer spoken orders. Another application may be used by a stock brokerage firm to respond to a calling customer voice request for a stock quotation by verbally quoting current information relating to the calling customer's account.

Speech recognition systems usually have a database lexicon storing patterns, such as voice templates or models, representing complete numbers, words and phrases used in various applications. In operation, received verbal information is compared with templates to identify the received verbal information as specific numbers, words or phrases. The lexicon templates are created and updated in a laboratory by technicians who collect data samples of speech from a large number of people. The speech data samples are verified manually and used to construct a template model of a number, word or phrase. The template model is subsequently added to the database lexicon of the appropriate speech recognition system.

A problem arises in that individual speech recognition systems require database lexicons of voice templates that are oftentimes used only by the system owner and the owner's customers and are unique thereto. For example, a hospital speech recognition system requires a lexicon of voice templates that are different and distinct from the voice templates recorded in a lexicon of a grocery wholesaler speech recognition system. Thus, each speech recognition system requires the collection of a large number of speech data samples and the manual verification of the speech data samples in order to construct templates required for each specific speech recognition system application. Accordingly, a need exists for an automatic speech recognizer for speech recognition systems and a method of operating the automatic speech recognizer that enables an owner of the system to enter information used in the owner's business application into a speech recognition system without requiring the collection and verification of large numbers of speech data samples.

SOLUTIONS

The foregoing problem is solved by apparatus and method arranged for enabling an owner of a speech recognition system to enter words used in the owner's application into the speech recognition system without collecting corresponding speech data samples, i.e. without the spoken entry of such words. A processor generates a phonetic transcription from the entered data and records and stores both the data, such as alphanumeric, and generated phonetic transcription associated therewith in a vocabulary lexicon database. The processor responds to receipt of spoken data by constructing a model consisting of one or more sequences of subwords characteristic of the spoken data and compares the constructed subword model to ones of the vocabulary lexicon database recorded phonetic transcriptions. The spoken data is recognized as the recorded data upon a match of the constructed subword model with a phonetic transcription recorded and associated with the recorded data.

DETAILED DESCRIPTION

Figure 1:
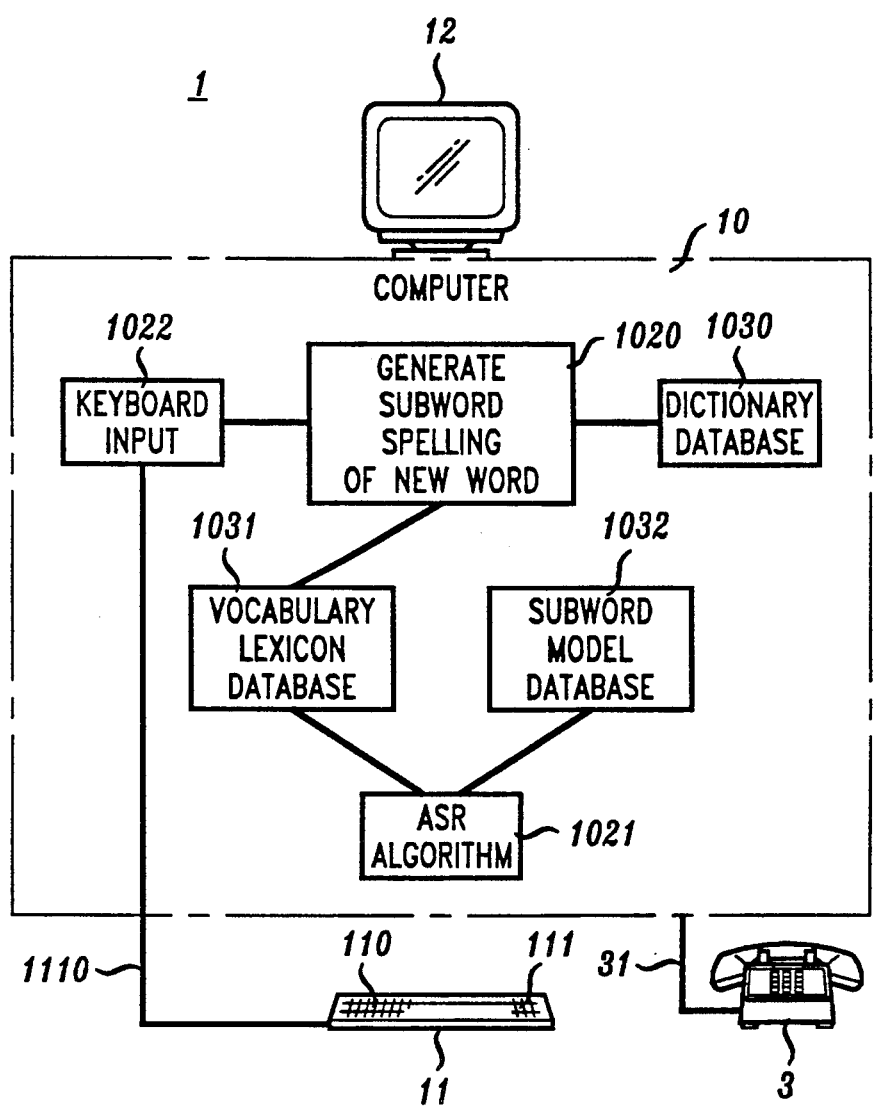
FIG. 1 illustrates a speech recognition system embodying the principles of the invention.

In an exemplary embodiment of the invention, speech recognition system 1, FIG. 1, is arranged to recognize spoken data such as alphanumeric data. Typically, such systems may be used in a wide variety of applications such as the order department of a large store. Such systems may be, although not limited thereto, connected with telephone lines, such as telephone line 31, and are used to transmit a voice prompt message to a calling customer using telephone 3. Speech recognition system 1 responds to the calling customer by recognizing alphanumeric data spoken by the customer in placing an order with the store. In other applications, speech recognition system 1 may be used in telephone operator applications to recognize calling party spoken telephone numbers and by stockbroker firms to recognize customers orders and requests for information. In still other applications, the principles of speech recognition system 1 may be used with a computer to enable the computer to recognize alphanumeric data spoken by a user of the computer.

Speech recognizing system 1 may be, although not limited thereto, a computer 10 such as an AT&T 386 or 486 computer. Such computers, FIG. 2, need not be described in detail for an understanding of the invention and in general have a central processing unit 101, memory unit 102, and an interface unit 100 each connected by address, data and control leads to a data bus 104. Interface unit 100 serves to couple a data link 1110 interconnected with data input device, such as keyboard 11 with data bus 104, so that alphanumeric data, such as words, numerals and information, entered into keyboard 11 may be exchanged with central processor unit 101 and memory unit 102. Data bus 104 is also interconnected with data storage device 103 used to store and record database infrastructures, such as database infrastructures 1030, 1031 and 1032, by address, data and control leads. Computer 10, FIG. 1, used as speech recognition system 1, may also have a video terminal 12 used to display data and information.

Figure 2:
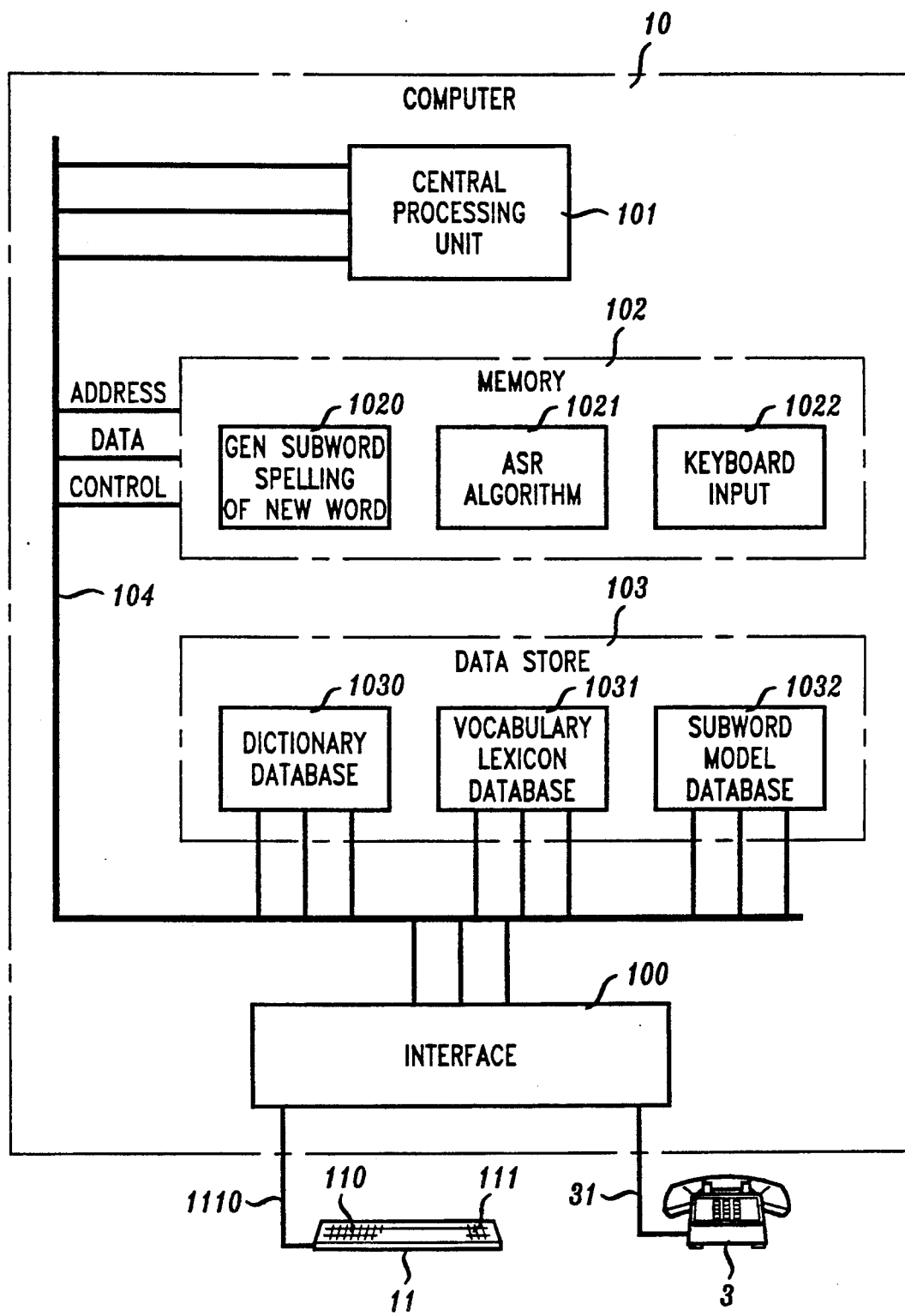
FIG. 2 sets forth the details of the processor of the speech recognition system illustrated in FIG. 1 in accordance with the principles of the invention.

In operation, FIG. 2, programs, such as generate subword spelling of new word program 1020, automatic speech recognition (ASR) algorithm program 1021 and keyboard input program 1022, are stored in memory unit 102 and are loaded into central processor unit 101 at the appropriate time to control operation of speech recognizer system 1 in accordance with the principles of the invention. Database infrastructures dictionary database 1030, vocabulary lexicon database 1031, and subword model database 1032 are stored in data store 103 and are accessed by central processor unit 102 to read information from and to store information therein.

Figure 3:
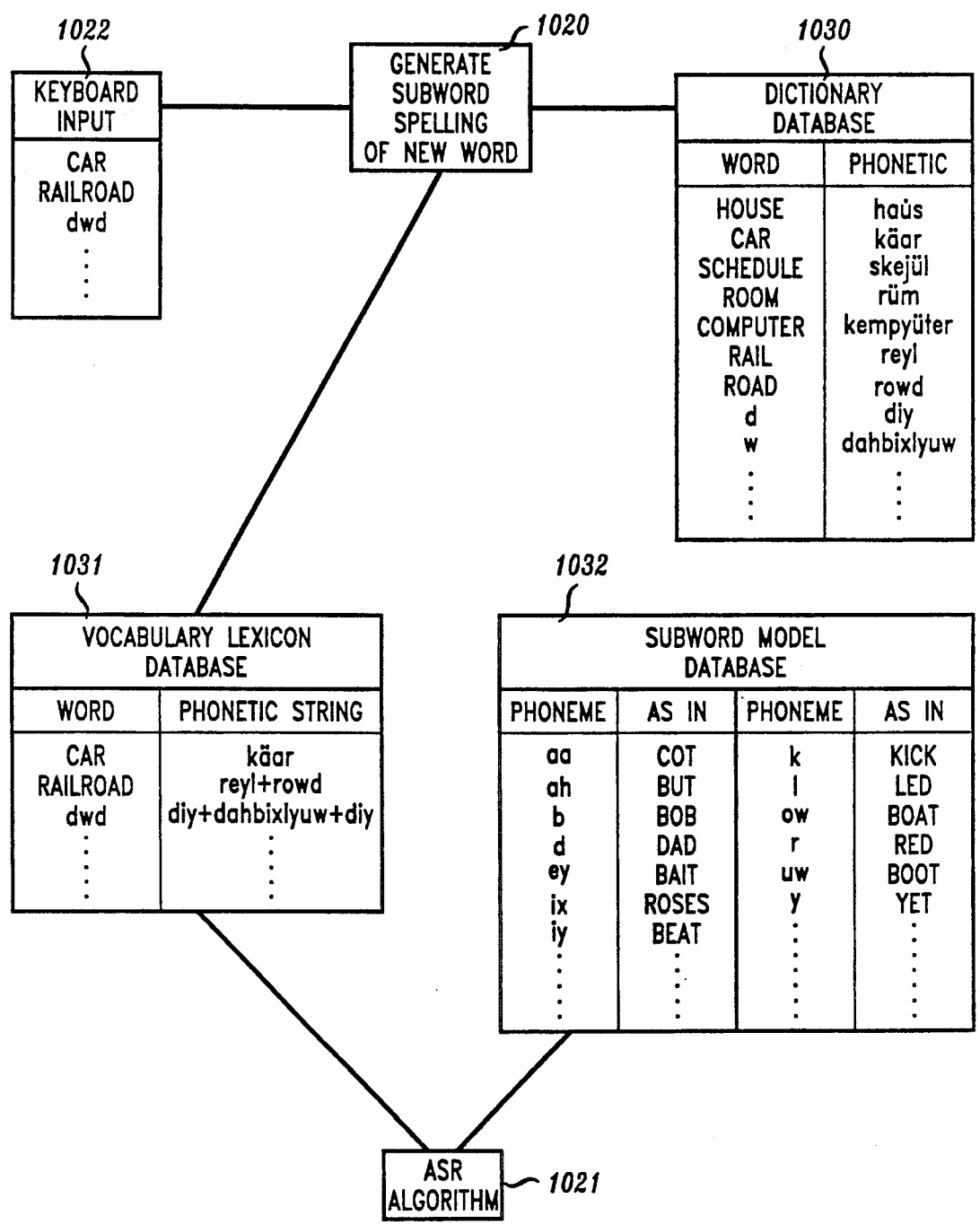
FIG. 3 sets forth illustrative processor programs and database files used with the speech recognition system set forth in FIGS. 1 and 2.

Dictionary database 1030, FIG. 3, stores words and a phonetic transcription of each stored word. Typically, the words may be those words found in a standard type of dictionary and are stored in dictionary database 1030 along with a phonetic transcription of the stored word or may be computed by generate subword spelling of new word program 1020. For example, the word "house" may be represented by the associated phonetic transcription "haus". Similarly, the stored word "car" may be represented by the associated phonetic transcription "kaar" and the word "computer" by the associated phonetic transcription "kempyuter". In addition, letters such as "d" and "w" may be represented by the transcriptions "diy" and "dahbixlyuw".

Vocabulary ASR lexicon database 1031 is used to record and store words and variations thereof with strings of phonetic transcriptions representing the words and variations of the recorded words. In a typical example, generate subword spelling of new word program 1020 will record the word "car" and the associated phonetic transcription string "kaar" in vocabulary lexicon database 1031. In another example, the variation of the words "rail" and "road" may be recorded as "railroad" with the associated phonetic transcription string "reylrowd".

Subword model database 1032 stores phonemes each identifying a small unit of speech that serves to distinguish one utterance from another. For example, the phoneme "aa" representing a sound as in "cot" is stored in subword model database 1032. Similarly, database 1032 stores phonemes "ah", "d", "ey" representing sounds as in "buf", "dad" and "bait", respectively.

A word or numeral, or strings thereof, FIG. 1, may be entered into speech recognition system 1 by typing the word or numeral on keys 110 and keypad 111 of keyboard 11. In other applications, new and additional words and numerals may be added to speech recognition system 1 by entering the words and numericals by tape, disk drives, extra memory or any of a number of different and well-known means of entering data into computer 10 by programs such as keyboard input program 1022. Generate subword spelling of new word program 1032, FIG. 2, controlling the operation of central processor unit 101 in accordance with an embodiment of the invention, responds to entry of words and numerals by accessing dictionary database 1030. When the entered word is found, for example, "house", FIG. 3, generate subword spelling of new word program 1020 generates a phonetic transcription string "haus" from the dictionary data dictionary phonetic transcriptions identified by the entered word. When a variation of words stored in dictionary database 1030 is entered into speech recognition system 1, such as a word "railroad", generate subword spelling of new word program 1020 accesses dictionary database 1030 and generates a phonetic transcription string "reylrowd" from dictionary database 1030 phonetic transcriptions "reyl" and "rowd" stored with words "rail" and "road" identified by the entered "railroad". Generate subword spelling of new word program 1020 records each entered word and the associated generated phonetic transcription string in vocabulary lexicon database 1031. Thus, entered words "car" and "railroad" and their associated phonetic strings "kaar" and "reylrowd" are recorded in vocabulary lexicon database 1031 for use in recognizing spoken words received by speech recognition system 1.

Upon receipt of spoken alphanumeric data over telephone line 31, FIG. 1, automatic speech recognition (ASR) algorithm program 1021, FIG. 3, accesses subword model database 1032 and constructs a model comprising a string of phonemes each identifying a small unit of speech that serves to distinguish one utterance from another and which represent sounds of the received spoken word. Thus, when the spoken word "car" is received, ASR algorithm program 1021 accesses subword model database 1032 and constructs phonemes "k", "aa" and "r" as a phoneme string "k aa r" identifying the received spoken word "car". In a like manner, ASR algorithm program 1021 responds to receipt of the spoken word "railroad" by accessing subword model database 1032 and constructing a model comprising the string of phonemes "r ey l r ow d" representing the received spoken word "railroad".

After constructing a string phoneme model representing the received spoken word, ASR algorithm program 1021 accesses vocabulary lexicon database 1031 and compares the constructed string phoneme model with ones of vocabulary lexicon database 1031 recorded phonetic transcription strings. When the constructed string phoneme model matches a phonetic transcription string recorded in vocabulary lexicon database 1031, the spoken word is recognized as the recorded word associated with the matched phonetic transcription string. Thus, when speech recognizer system 1, FIG. 1, receives the spoken word "railroad", ASR algorithm program 1021, FIG. 3, accesses subword model database 1032 and constructs a string phoneme model "r ey l r ow d". Program 1021 then accesses vocabulary lexicon database 1031 and compares the constructed string phoneme model "r ey l r ow d" with ones of the vocabulary lexicon recorded phonetic transcription strings. The spoken word "railroad" is recognized as the word "railroad" recorded with the phonetic transcription string "reylrowd" when the constructed string phoneme model "r ey l r ow d" matches the recorded phonetic transcription string "reylrowd".

Speech recognizing system 1, FIG. 1, normally has a large number of words stored and recorded in dictionary and vocabulary lexicon databases 1030, 1031, respectively. Additional words may be entered into speech recognizing system 1 and recorded in vocabulary lexicon database 1031 to enable the system to recognize the additional words. Such words may be unique words used in specific applications of speech recognizing system 1. In the present embodiment of the invention, it is assumed that a special word "dwd" unique to a specific application is to be entered into speech recognizing system 1.

The method of operating speech recognizing system 1 for recognizing a spoken word such as "dwd" comprises generating a phonetic transcription string "diydahbixlyuwdiy" from the word "dwd" and recording both the word "dwd" and generated phonetic transcription string "diydahbixlyuwdiy" in vocabulary lexicon database 1031, FIG. 3. Upon receiving the spoken word "dwd", the method of operating speech recognizing system 1 accesses subword model database 1032 and constructs a model string of phonemes "d iy d ah b ix l y uw d iy" characteristic of the sounds of the spoken word "dwd". The constructed phoneme string model "d iy d ah b ix l y uw d iy" is compared to ones of the lexicon vocabulary recorded phonetic transcription strings and when there is a match of the constructed phoneme string model "d iy d ah b ix l y uw d iy" with the vocabulary lexicon database 1031 recorded phonetic transcription string "diydahbixlyuwdiy", the spoken word is recognized as the word "dwd" recorded with the matched phonetic transcription string "diydahbixlyuwdiy".

Figure 4:
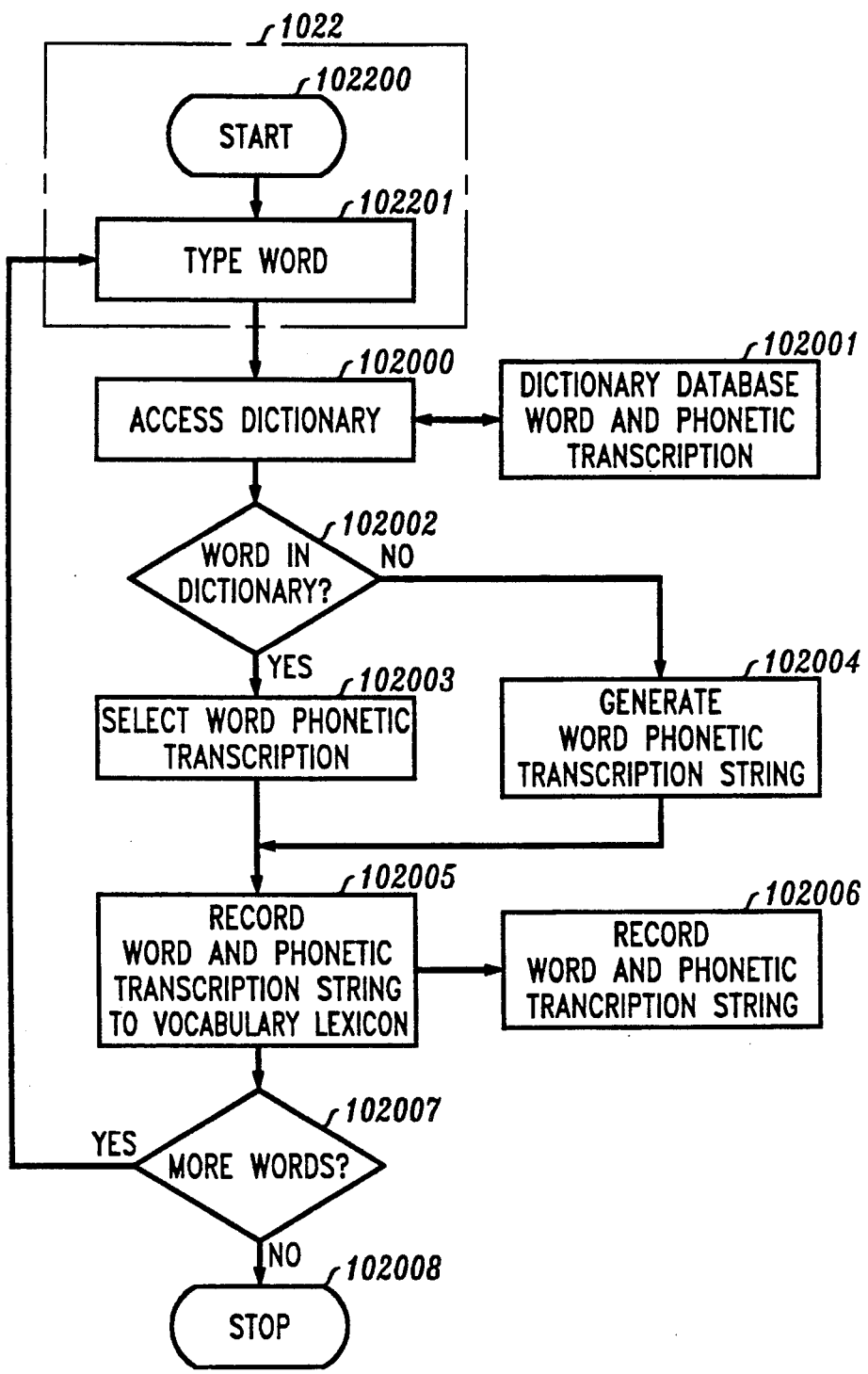
FIGS. 4 and 5 illustrate flowcharts of the operation of the speech recognition system set forth in FIG. 1 in accordance with the principles of the invention.

In the method of operation, FIG. 1, a dictionary of standard words and a phonetic transcription of each standard word is initially stored in dictionary database 1030. Similarly, subword model database 1032 initially stores phonemes, such as "d" and "w", each identifying a small unit of speech that serves to distinguish one utterance from another. To enter a new word, such as the word "dwd", into speech recognizing system 1, the word "dwd" is typed into keyboard 11 and entered into keyword input program 1022, steps 102200, 102201, FIG. 4. Generate subword spelling of new word program 1020, FIG. 1, responds to the entry of alphanumeric data and variations thereof, such as the word "dwd", by accessing dictionary database 1030, steps 102000, 102001, FIG. 4. If the entered word is located in dictionary database 1030, step 102002, generate subword spelling of new word program 1020 selects the word and associated phonetic transcription string, step 102003, and records both the word and associated phonetic transcription string in vocabulary lexicon database 1031, steps 102005, 102006.

When the entered word, for example word variation "dwd", is not found in dictionary database 1030, step 102002, generate subword spelling of new word program 1020 selects component words, FIGS. 3, "d" and "w" from dictionary database 1030 to generate the phonetic transcription string "diydahbixlyuwdiy", step 102004. The word variation "dwd" and generated phonetic transcription string "diydahbixlyuwdiy" is recorded in vocabulary lexicon database 1031, steps 102005, 102006. If more words are to be entered into speech recognition system 1, step 102007, step 102201 and steps 102000 through 102007 are repeated until all the entered words have been recorded in vocabulary lexicon database 1031 at which time central processor unit 101 exits generate subword spelling of new word program 1020, step 102008.

Figure 5:
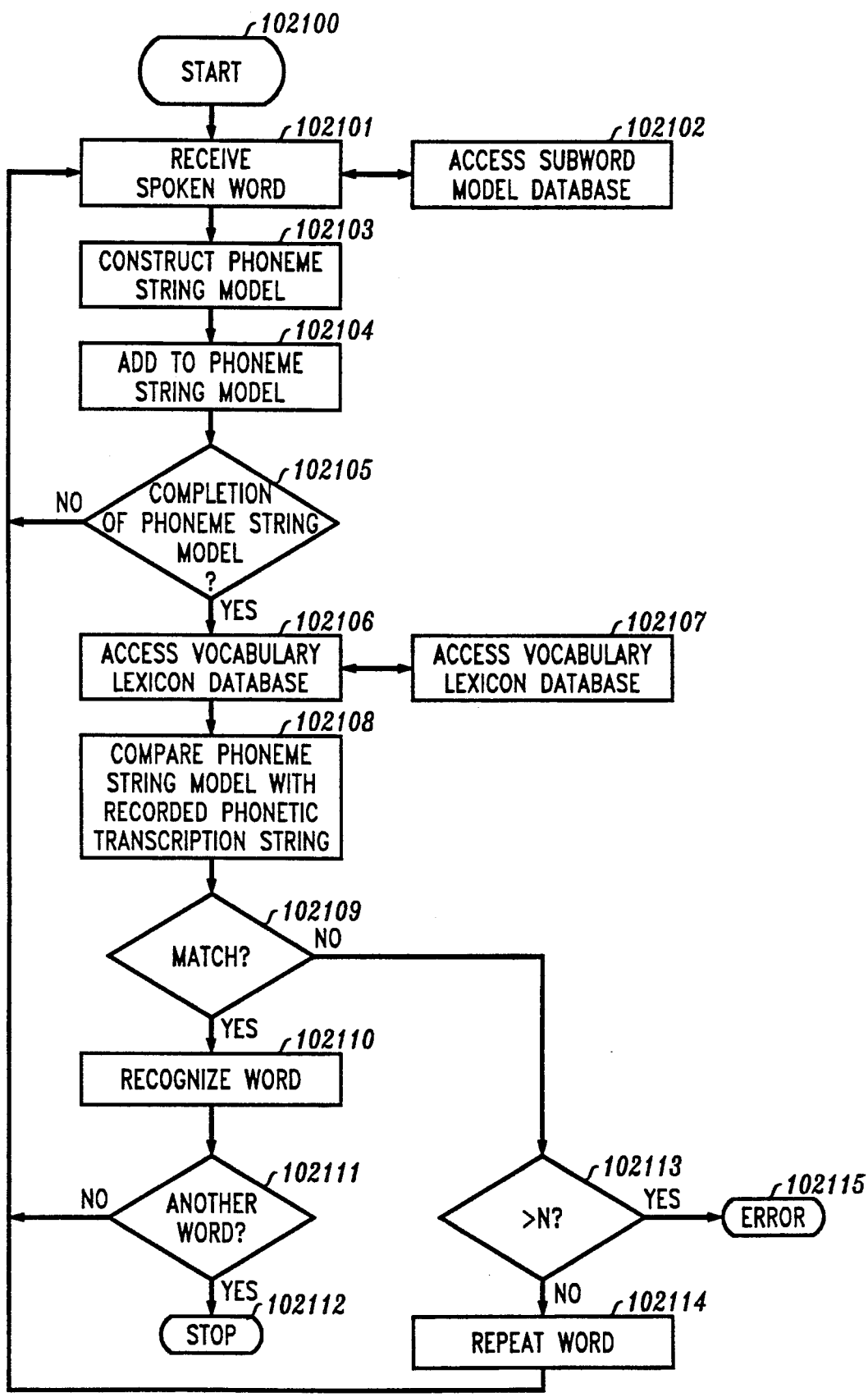

Speech recognition system 1, FIG. 1, operating in accordance with ASR algorithm program 1021, responds to a spoken word, such as word "dwd", received over telephone line 31, FIG. 5, steps 102100, 102101, 102102, by accessing subword model database 1032. In response to the receipt of the spoken word "dwd", ASR algorithm program 1021, step 102103, initiates a construction of a model comprising a string of phonemes representing the received spoken word "dwd". Construction of the model is in accordance with the sound of the received "dwd" and the sound "d" results in the selection of "d iy" for the first part of the string model, step 102104. Since the model is not completed, step 102105, steps 102101 through 102105 are repeated such that the sound of "w" results in the phonemes "d ah b ix l y uw" being selected from subword model database 1032 and added to the model. The phoneme string model is completed when the last sound "d" results in the phonemes "d iy" being added to the string to complete the phoneme string model "d iy d ah b ix l y uw d iy" representation of the spoken word "dwd", step 102105.

Upon the completion of the constructed phoneme string model "d iy d ah b ix l y uw d iy" representation of the spoken word "dwd", ASR algorithm program 1021 accesses vocabulary lexicon database 1031 and compares the constructed string phoneme model "d iy d ah b ix l y uw d iy" with ones of the vocabulary lexicon database recorded phonetic transcription strings, steps 102106, 102107, 102108. If there is a match of the constructed phoneme string model "d iy d ah b ix l y uw d iy" with the recorded phonetic transcription string "diydahbixlyuwdiy", step 102109, the spoken word "dwd" is recognized as the word "dwd" recorded in vocabulary lexicon database 1031, step 102110. When there are additional spoken words, step 102111, steps 102101 through 102111 are repeated until all words have been recognized.

Should there be a failure to match, step 102109, and the match attempt is less than a predetermined attempt number, step 102113, ASR algorithm program 1021 increases the repeat attempt number and prompts the caller to repeat the spoken word, step 102114. Steps 102101 through 102109 are then repeated. Should the attempt number exceed the predetermined attempt number, it is determined that an error has occurred, step 102115.

During the matching process, step 102109, a confidence recognition factor is assigned to the match of the constructed phoneme string model with phonetic transcription strings recorded in vocabulary lexicon database 1031. When the assigned confidence recognition factor exceeds a predetermined threshold value, a determination is made that the spoken word associated with the constructed phoneme string model is recognized as the word recorded in vocabulary lexicon database 1031 and associated with the matched phonetic transcription string.

What is claimed is:

1. A speech recognition system comprising:
   a vocabulary database that contains a plurality of words and a corresponding phoneme string for each of said words;
   a subword database that stores a plurality of phonemes representing word sounds;
   processor means for determining if a first spoken word received as an input is one of said words contained in said vocabulary database, said processor means generating a first phoneme string based on phonemes stored in said subword database to represent said first word and determining which, if any, of said phoneme strings contained in said vocabulary database matches said first phoneme string;
   means for receiving a new non-spoken word in dictionary form as a series of characters, said new word not previously contained in said vocabulary database;
   said processor means ascertains a new phoneme string based on said new word and enters said new word and new phoneme string in said vocabulary database thereby enabling a subsequent spoken entry of the new word to be recognized based on the presence of the new word in the vocabulary database.

2. The system according to claim 1 wherein said processor means comprises a dictionary database that contains a plurality of words and a corresponding phoneme string for each of said words, said processor means selecting a phoneme string stored in said dictionary database corresponding to said new non-spoken word as the new phoneme string that is stored with said new word in the vocabulary database.

3. The system according to claim 2 wherein said processor means ascertains said new phoneme string without requiring the concurrent entry of the new word in spoken form.

4. The system according to claim 1 wherein said processor means ascertains said new phoneme string without requiring the concurrent entry of the new word in spoken form.

5. A speech recognition system comprising:
   a vocabulary database that contains a plurality of words and a corresponding phoneme string for each of said words;
   a subword database that stores a plurality of phonemes representing word sounds;
   processor means for determining if a first spoken word received as an input is one of said words contained in said vocabulary database, said processor means generating a first phoneme string based on phonemes stored in said subword database to represent said first word and determining which, if any, of said phoneme strings contained in said vocabulary database matches said first phoneme string;
   means for adding sets of new words and corresponding phoneme strings in said vocabulary database without requiring the concurrent spoken entry of such new words, said adding means comprising means for receiving a new non-spoken word in dictionary form as a series of characters, said new word not previously contained in said vocabulary database, and said processor means ascertaining a new phoneme string based on said new word and entering said new word and new phoneme string in said vocabulary database thereby enabling a subsequent spoken entry of the new word to be recognized based on the presence of the new word in the vocabulary database.

6. The system according to claim 5 wherein said processor means comprises a dictionary database that contains a plurality of words and a corresponding phoneme string for each of said words, said processor means selecting a phoneme string stored in said dictionary database corresponding to said new non-spoken word as the new phoneme string that is stored with said new word in the vocabulary database.

7. A method for recognizing spoken words comprising the steps of:
   generating a vocabulary database that contains a plurality of words and a corresponding phoneme string for each of said words;
   generating a subword database that stores a plurality of phonemes representing word sounds;
   determining by use of a processor means if a first spoken word received as an input is one of said words contained in said vocabulary database, said determining step including generating a first phoneme string based on phonemes stored in said subword database to represent said first word and determining which, if any, of said phoneme strings contained in said vocabulary database matches said first phoneme string;
   receiving a new non-spoken word in dictionary form as a series of characters, said new word not previously contained in said vocabulary database;
   ascertaining by use of said processor means a new phoneme string based on said new word and entering said new word and new phoneme string in said vocabulary database so as to enable a subsequent spoken entry of the new word to be recognized based on the presence of the new word in the vocabulary database.

8. The method according to claim 7 further comprising the steps of generating a dictionary database that contains a plurality of words and a corresponding phoneme string for each of said words, and selecting a phoneme string stored in said dictionary database corresponding to said new non-spoken word as the new phoneme string that is stored with the new word in the vocabulary database.

9. The method according to claim 8 wherein said new phoneme string is ascertained without requiring the concurrent entry of the new word in spoken form.

10. The method according to claim 7 wherein said new phoneme string is ascertained without requiring the concurrent entry of the new word in spoken form.

11. A speech recognition method comprising the steps of:
    generating a vocabulary database that contains a plurality of words and a corresponding phoneme string for each of said words;
    generating a subword database that stores a plurality of phonemes representing word sounds;
    determining by use of a processor means if a first spoken word received as an input is one of said words contained in said vocabulary database, said determining step including the steps of generating a first phoneme string based on phonemes stored in said subword database to represent said first word, and determining which, if any, of said phoneme strings contained in said vocabulary database matches said first phoneme string;
    adding sets of new words and corresponding phonemes in said vocabulary database without requiring the concurrent spoken entry of such new words, said adding step including the steps of receiving a new non-spoken word in dictionary form as a series of characters, said new word not contained in said vocabulary database, and ascertaining by use of said processor means a new phoneme string based on said new word, and entering said new word and new phoneme string in said vocabulary database to enable a subsequent spoken entry of the new word to be recognized based on the presence of the new word in the vocabulary database.

12. The method according to claim 11 further comprising the steps of generating a dictionary database that contains a plurality of words and a corresponding phoneme string for each of said words, and selecting a phoneme string stored in said dictionary database corresponding to said new non-spoken word as the new phoneme string.

* * * * *